Dec. 21, 1965  J. P. ALEXANDER  3,224,512
SOIL SAMPLER
Filed July 29, 1963  7 Sheets-Sheet 1

INVENTOR
JACK P. ALEXANDER
BY
ATTORNEYS

Dec. 21, 1965  J. P. ALEXANDER  3,224,512
SOIL SAMPLER
Filed July 29, 1963  7 Sheets-Sheet 3

INVENTOR
JACK P. ALEXANDER
BY
ATTORNEYS

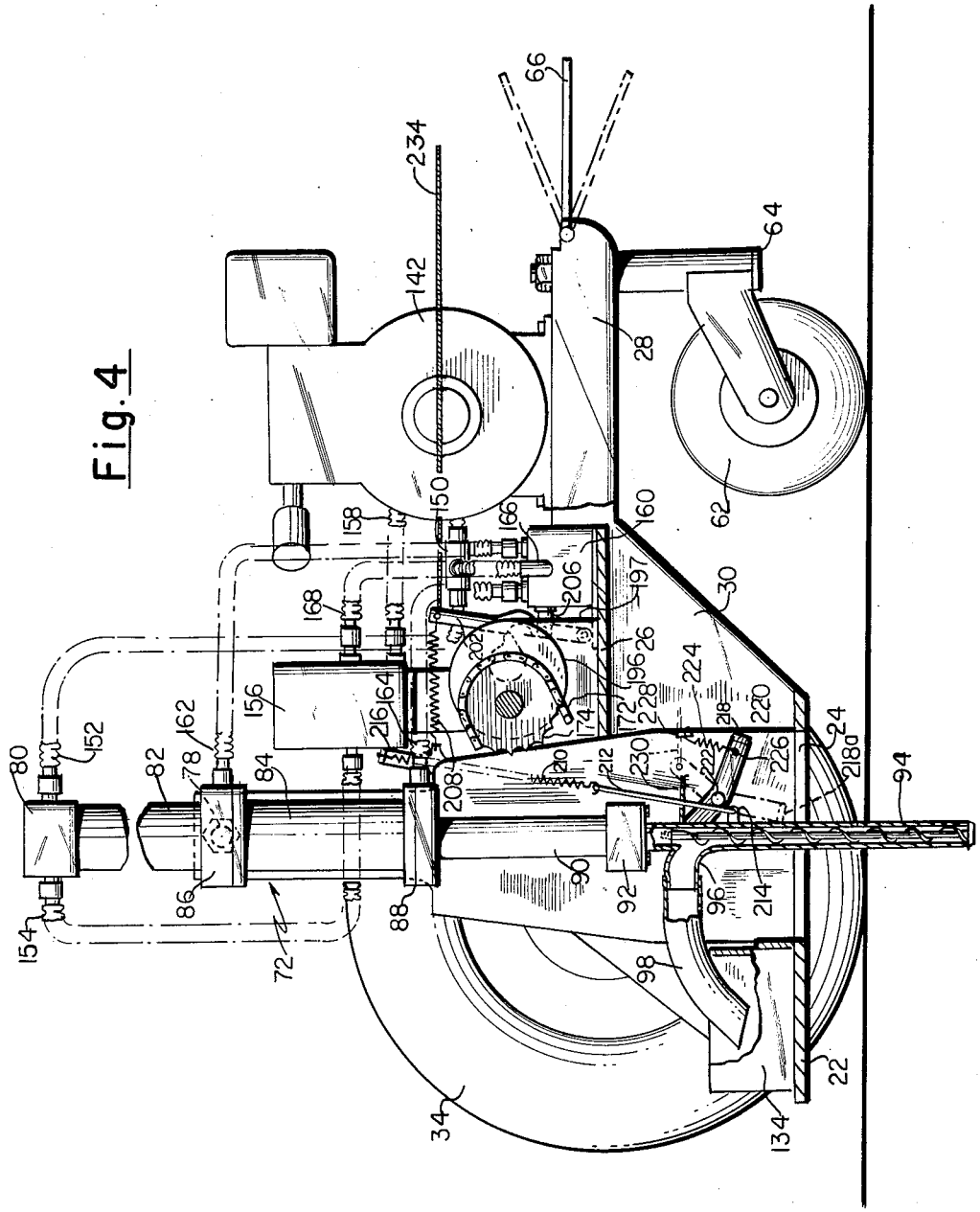

Dec. 21, 1965    J. P. ALEXANDER    3,224,512
SOIL SAMPLER

Filed July 29, 1963    7 Sheets-Sheet 5

INVENTOR
JACK P. ALEXANDER
BY *Kenyon & Kenyon*
ATTORNEYS

Dec. 21, 1965  J. P. ALEXANDER  3,224,512
SOIL SAMPLER

Filed July 29, 1963  7 Sheets-Sheet 6

INVENTOR
JACK P. ALEXANDER
BY *Kenyon & Kenyon*
ATTORNEYS

Dec. 21, 1965  J. P. ALEXANDER  3,224,512
SOIL SAMPLER
Filed July 29, 1963  7 Sheets-Sheet 7
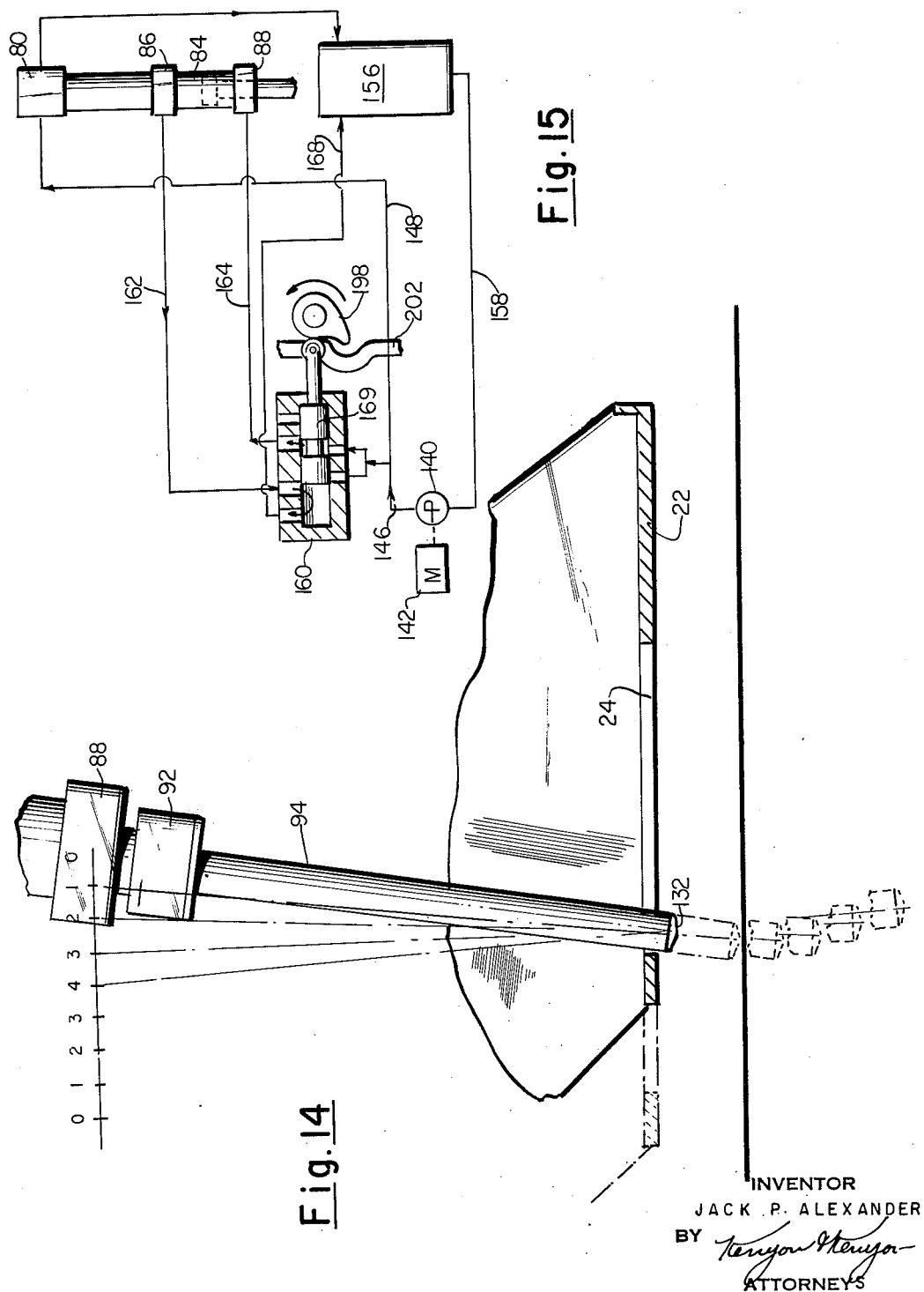
INVENTOR
JACK P. ALEXANDER
BY
ATTORNEYS

United States Patent Office 3,224,512
Patented Dec. 21, 1965

1

3,224,512
SOIL SAMPLER
Jack P. Alexander, Ardmore, Okla., assignor to The Samuel Roberts Noble Foundation Incorporated, Ardmore, Okla., a corporation of Oklahoma
Filed July 29, 1963, Ser. No. 298,194
6 Claims. (Cl. 173—19)

This invention relates to machines for obtaining soil samples, and more particularly to a fluid pressure operated soil sampler including a mounting vehicle.

One of the most difficult problems when taking soil samples is to obtain a sample which is representative of the area being sampled. It is not possible to do this with any assurance of reliability by taking a single sample. Instead in order to get a representative sample, it is necessary to take a plurality of samples at different points in the area.

Previously known soil samplers have the disadvantage that they do not assure that a representative sample will be obtained. For example, in the fluid pressure operated and vehicle mounted soil sampling machines previously known, the operator would drive the vehicle to the place where he wished to take a sample, and then cause the sampling device to be inserted into the ground and thereby take a sample. Before inserting the sampling device, it was necessary to bring the vehicle to a full stop and to position it in the desired spot for taking the sample. The disadvantages of such a device are two-fold. First and foremost, the selection for locations for taking samples is left entirely to the operator. He may take samples at relatively closely spaced locations in one operation of the area sampled and at relatively widely spaced locations in another operation, thereby obtaining an unrepresentative overall sample. Furthermore, each time a sample is taken, it is necessary to bring the vehicle to a full stop, and this unduly lengthens the amount of time necessary to sample a given area. Previously known soil samplers have another disadvantage in that the sample must be removed manually while this invention elevates the sample into a pan.

An object of this invention is to provide a fluid pressure operated, vehicularly mounted soil sampling device by which representative samples are automatically taken at predetermined intervals and depths.

A further object of this invention is to provide a soil sampling device of the character described in which a sample can be taken while the vehicle is in motion.

These and other objects and advantages of the present invention as well as its nature and substance will be more clearly perceived and fully understood by referring to the following description and claims taken in connection with the accompanying drawings in which:

FIG. 4 is a side elevation view of the soil sampler of this invention including its mounting vehicle, as seen from the right side of the vehicle;

FIG. 14 is a schematic view of a portion of the sampling tube, showing the positions that it progressively assumes as it is inserted into the ground;

FIG. 15 is a schematic diagram of the hydraulic system for actuating the sampling tube, the directions indicated by the arrows being the directions of fluid flow when the sampling tube is being inserted into the ground.

Figure 1:
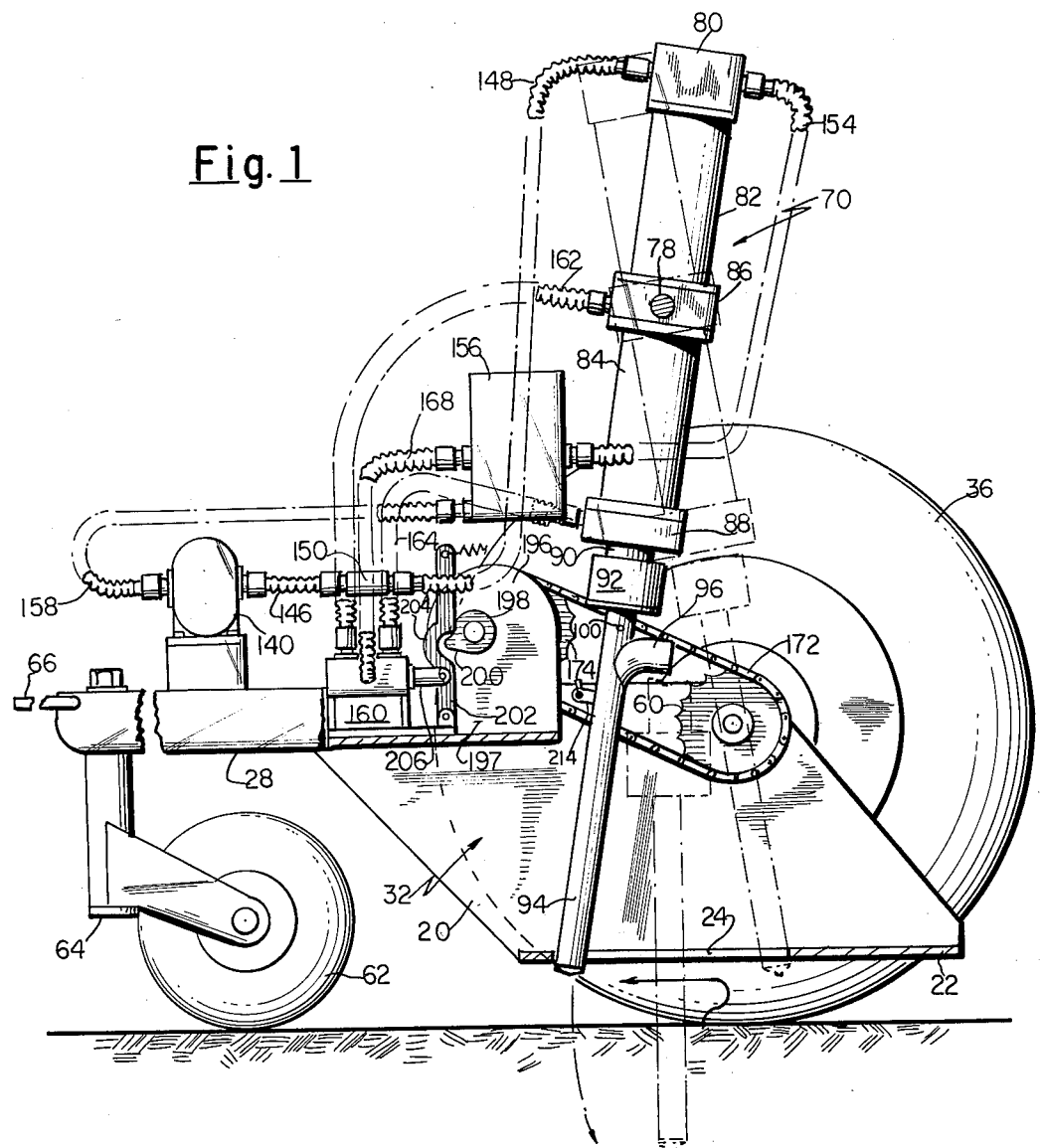
FIG. 1 is a side elevation view of the soil sampler of this invention, including a mounting vehicle which is adapted to be towed, as seen from the left side of said vehicle.

Referring now to the drawings in detail, especially FIGS. 1 to 4 thereof, 20 designates a vehicle frame having a flat rear platform 22 which lies only a small distance above the ground, said rear platform 22 having a longitudinal slot 24 therein. Vehicle 20 also has a center platform 26 and a front frame member 28. Left and right side walls 30 and 32 respectively extend upwardly from rear platform 22, and both rear platform 22 and center platform 26 have their lateral extremities in these side walls.

Figure 2:
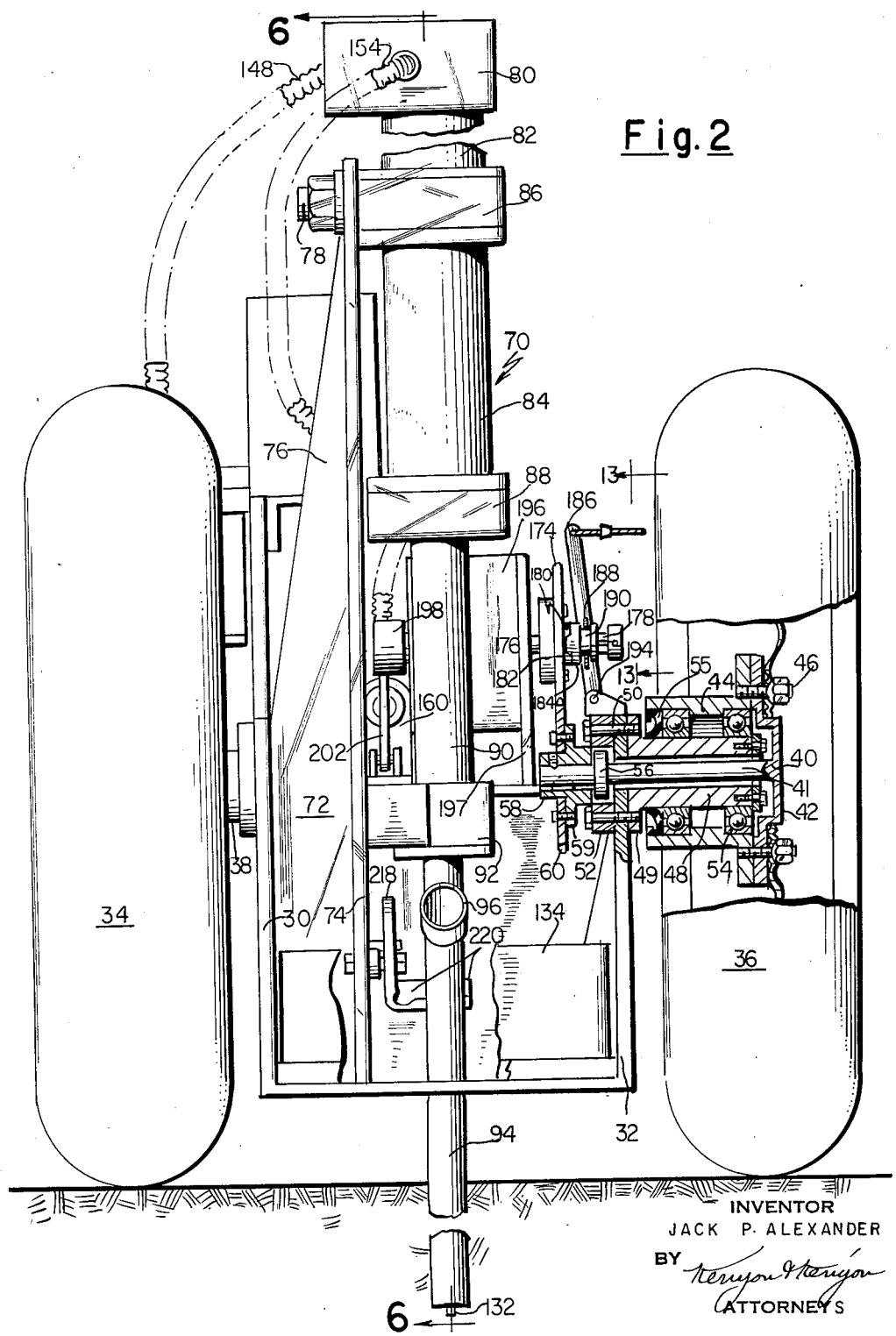
FIG. 2 is an end elevation view of the soil sampler as seen from the rear of its mounting vehicle, showing in section details of an axle structure.

The vehicle frame has left and right rear wheels 34 and 36 respectively. Left rear wheel 34 is journaled in left side wall 30 by means of a conventional solid axle 38. Right rear wheel 36 is journaled for rotation in right side wall 32 by means of an axle indicated generally at 40. The details of this axle structure are shown in FIG. 2. Axle 40 consists of a solid center shaft 41, a hub 42 which is integral with this shaft, and a hollow cylindrical sleeve 44, which surrounds shaft 41 and is fastened to hub 42 by means of bolts 46. A hollow cylindrical sleeve 48 is located in the space between shaft 41 and sleeve 44. Sleeve 48 has a flanged portion 49 which bears against side wall 32, and is secured to wall 32 by bolts 50. Spacer 52 is provided under the bolt heads. Ball bearings 54, which are retained in place by washers 55, permit free rotation between axle structure 40 and sleeve 48. Lateral inward movement of wheel 36 is restrained by washers 55 striking flange 49, and lateral outward movement is restrained by collar 56 which is secured to shaft 41. As shown, collar 56 is adjacent spacers 52 and is of lesser thickness than said spacers. Sleeve 58 is secured to shaft 41 axially inwardly of collar 56 and has an outside diameter slightly less than the inside diameter of spacers 52, so as to provide a small clearance therebetween. Sleeve 58 has a flange 59, to which is secured a sprocket 60. This sprocket 60 constitutes a portion of the drive mechanism for the fluid pressure system of the sampling device of the present invention as is hereinafter described.

Vehicle frame 20 is also provided with a front wheel 62, which is shown as having a swiveled mounting 64. A trailer hitch 66 extending from the front end of the vehicle frame provides for towing this vehicle by any conventional powered automotive vehicle, as for example a farm tractor.

The sampling device indicated generally at 70 is pivotally mounted on an upright supporting member 72 which is secured to the rear platform 22 of vehicle frame 20. Supporting member 72 has a longitudinal flange 74, a transverse flange 76, and a bolt 78 at the upper end of longitudinal flange 74 for pivotally mounting the sampling device.

The sampling device includes, from top to bottom, a fluid motor 80, a hollow cylindrical drive shaft housing 82, a cylinder 84 having upper cylinder head 86 and lower cylinder head 88, a hollow cylindrical piston rod 90 which is vertically reciprocable as is explained in greater detail hereinafter, a bearing housing 92, a sampling tube 94 having a right angle bend 96 in its upper portion adjacent bearing housing 92, and a spout 98 which preferably is made separate from right angle bend 96 so as to permit detachment. Spout 98 is shown as attached to right angle bend 96 in FIG. 4, but is removed in FIGS. 1, 2 and 3. It is desirable to provide dust holes 100 for the escape of dust which may collect in sampling tube 94.

Figure 6:
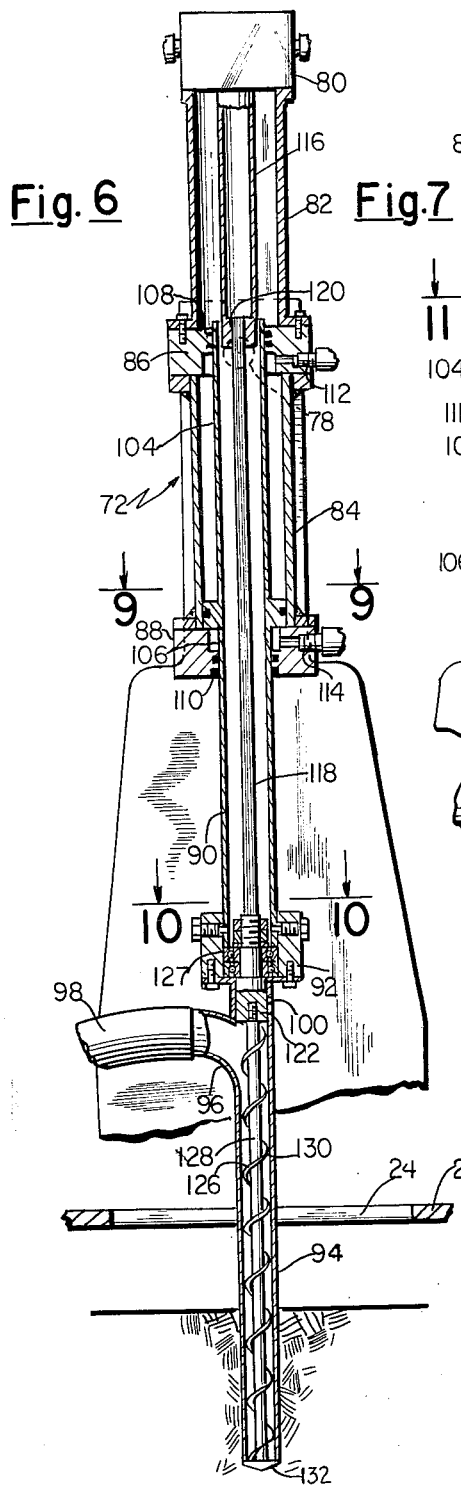
FIG. 6 is a vertical section view through the sampling tube and piston and drive shaft structure therefor taken along line 6—6 in FIG. 2, the tube being in its lowermost position.
Figure 7:
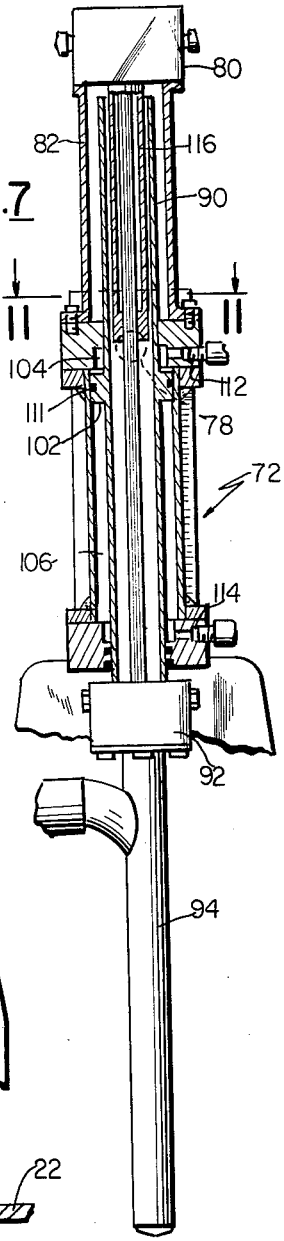
FIG. 7 is a view similar to FIG. 6 but only partly in section, showing the sampling tube in its raised or retracted position.
Figure 8:
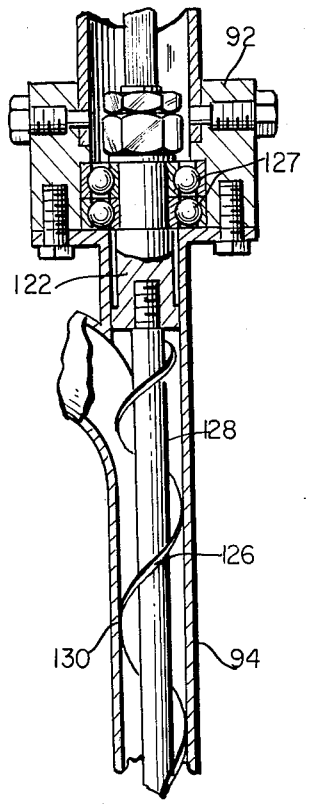
FIG. 8 is an enlarged detail of the bearing assembly shown in FIG. 6.
Figure 9:
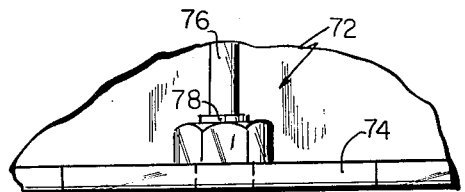
FIG. 9 is a section taken along the line 9—9 in FIG. 6.
Figure 11:
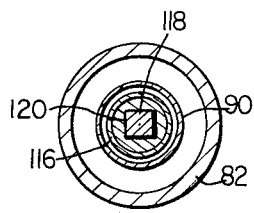
FIG. 11 is a section taken along the line 11—11 in FIG. 7.
Figure 10:
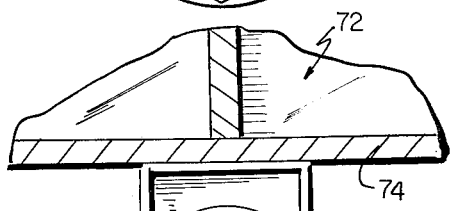
FIG. 10 is a section taken along the line 10—10 in FIG. 6.
Figure 12:
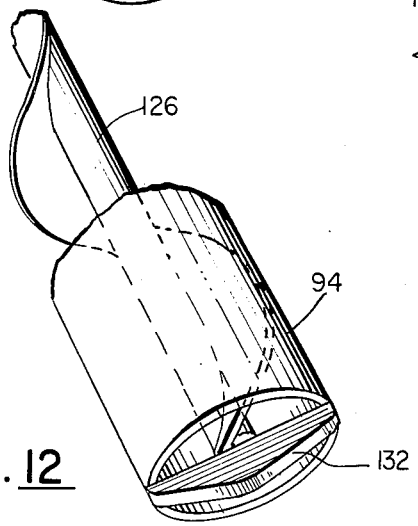
FIG. 12 is an isometric drawing of the lower portion of the sampling tube and auger therein, with portions broken away, showing the auger tip.
Figure 13:
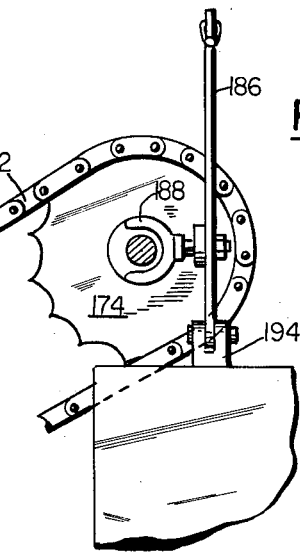
FIG. 13 is a side elevation view of a portion of the drive mechanism for actuating the sampling tube, showing in particular the clutch and actuating lever therefor in said drive mechanism.

Referring next to FIGS. 6 to 8 inclusive, sampling tube 94 is fixedly secured to piston rod 90 to which is attached a piston 102. As illustrated, piston rod 90 extends above piston 102 as well as below piston 102 through an upper piston chamber 104 and a lower piston chamber 106 defined within cylinder 84. Sealing rings 108 and 110 in upper and lower cylinder heads 86 and 88 respectively preserve fluid tight seals at the extremities of upper and lower piston chambers 104 and 106 respectively while a sealing ring 111 in piston 102 seals chambers 104 and 106 from each other. A lateral port 112 in cylinder head 86 provides for admission of fluid under pressure to the top of cylinder 84 into upper piston chamber 104. A similar lateral port 114 in lower cylinder head 88 provides for the admission of fluid under pressure to the bottom of cylinder 84, i.e. into lower piston chamber 106.

FIG. 6 shows a piston 102 in its lowermost position, and sampling tube 94 inserted into the ground. In this position the upper portion of piston rod 90 extends just above the upper cylinder head 86. When the sampling tube 94 is retracted, as shown in FIG. 7, piston 102 is at the upper end of its travel and the upper portion of piston rod 90 is contained within the cylinder 82.

Fluid motor 80 drives a hollow motor shaft 116, which in turn is fixedly secured to an auger drive shaft 118, as for example through a sleeve 120. Conveniently shaft 118 is square in cross section, except at its lower end, and sleeve 120 may then have a smooth square inner surface and a screw threaded outer surface for engaging hollow shaft 116. The lower end of shaft 118 is circular in cross section and is screw threaded to receive auger 126. Ball bearings 127 are conveniently provided for rotation of shaft 118 and particularly the lower portion 122 thereof in bearing assembly 92. Auger 126 is preferably a conventional helical screw auger having a shaft 128 which is externally screw threaded at its upper end for insertion into bearing sleeve 122. This shaft has a helical blade 130, and terminates at its lower end in auger tip 132. Rotation of hollow shaft 116 and auger drive shaft 118 by means of fluid motor 80, which takes place continuously while the device is in operation, causes the rotation of auger 126 and the resultant removal of soil when sampling tube 94 is inserted into the ground. Soil which is brought up through sampling tube 94 by means of auger 126 is discharged through right angle bend 96 and spout 98 into sample pan 134.

The fluid pressure system for operating piston 102 and thereby reciprocating sampling tube 94 is preferably an hydraulic system, although other fluid pressure systems such as a compressed air system can be used if desired. The hydraulic system illustrated herein contains a pump 140 which serves as a source of fluid pressure. Pump 140 is driven by prime mover 142, which may be any conventional prime mover such as a gasoline or diesel engine. Engine 142 drives pump 140 through a centrifugal clutch 144. Centrifugal clutch 144 renders the connection between engine 142 and pump 140 inoperative during start-up of the engine and then causes rotation of the pump after the engine has achieved a certain running speed.

High pressure fluid discharged from pump 140 is conveyed by conduits 146 and 148 to fluid motor 80. Between conduits 146 and 148 is a T-connection 150. Conduit 146 is relatively short and is preferably flexible in its entirety. Conduit 148, as well as all other conduits in the fluid pressure system to be hereinafter described, may be constructed of either a flexible material or a rigid material with flexible sections such as section 152 to permit bending. A casting conduit 154 leads from fluid motor 80 to tank or reservoir 156. Return conduit 158 for low pressure fluid leads from tank 156 to the low pressure or inlet side of pump 140.

A four-way valve 160 is provided for controlling the movements of piston 102. Conduit 162 leads from four-way valve 160 to the top of cylinder 84 terminating in lateral port 112, and conduit 164 leads from four-way valve 160 to the bottom of cylinder 84 terminating in lateral conduit 114. High pressure fluid is conveyed from T-connection 150 to four-way valve 160 by means of conduit 166. Low pressure fluid is conveyed from four-way valve 160 to tank or reservoir 156 by means of conduit 168.

The operation of four-way valve 160 can be best understood by reference to FIG. 15. FIG. 15 shows four-way valve 160 and a reciprocable piston 169 therein, as well as the fluid pressure connections leading to cylinder 84 diagrammatically. When piston 169 is in the position shown, high pressure fluid from pump 140 flows through conduits 146 and 166 into a chamber inside valve 160 and thence through conduit 164 to the bottom of cylinder 84. Simultaneously the top of cylinder 84 is put in communication with tank 156, which is at low pressure, via conduits 162 and 168. Since the pressure in the lower portion of cylinder 84 exceeds the pressure in the upper portion, piston 102 and sampling tube 94 are in the upper or retracted position. This is their usual position as is hereinafter explained in greater detail. When piston 169 in four-way valve 160 is moved to the opposite end of its travel, the fluid connections of conduits 162 and 164 are reversed. Then conduit 162 is put into communication with high pressure fluid flowing from pump 140 via conduits 146 and 166, and conduit 164 is in communication through conduit 168 with the low pressure tank 156. This causes the piston 102 and sampling tube 94 to be driven downwardly into the ground, so that a soil sample is taken.

Referring again to FIGS. 1 to 4 of the drawings, chain 172 engages sprocket 60 and a second sprocket 174, which is mounted for free rotation on shaft 176. Shaft 176 has a splined end portion 178. Dental clutch 180, which consists of a fixed plate 182 attached to sprocket 174, and a movable plate 184 which is adapted to be reciprocated along the splined portion 178 of shaft 176, is provided to transmit motion from sprocket 174 to shaft 176. When the sampling device is in operation, clutch plates 182 and 184 are engaged as shown in FIG. 2. When it is desired to disengage clutch plates 182 and 184, as for example when the vehicle is being towed over a road or through a field where no soil samples are to be taken, plate 184 is moved to the right as shown in FIG. 2 by means of lever 186 which has attached thereto a bifurcated member 188 extending laterally therefrom and into a recessed portion 190 on movable clutch plate 184. A control cord 192 which leads to the dashboard of the tractor or other towing vehicle is provided for movement of lever 186. Lever 186 is movable at its upper end, and fixedly secured at its lower end to the vehicle frame by means of bracket and pivot 194.

Reducing gear 196, which is supported on block 197 resting on platform 26, is provided to transmit motion from the shaft 176 to cam 198. Cam 198 thus rotates during normal operation, i.e. at all times except when clutch 180 is disengaged, and the ratio of number of turns of cam 198 to a given number of turns of vehicle wheel 36 is fixed. The gear ratio, i.e. the ratio of turns of cam 198 to a given number of turns of vehicle wheel 36, can be altered by changing the relative size of the gears within reducing gear mechanism 196, or by changing the size of either sprocket 60 or sprocket 174. Cam 198 has a finger 200 which contacts a lever 202 having a follower portion 204 which is generally arc shaped to receive cam finger 200. Lever 202 in turn actuates rod 206 to move the piston member 169 in four-way valve 160 from one position to another. Tension spring 208 is provided to return lever 202 to its normal position (i.e. to the right as shown in FIG. 1 or to the left as shown in FIG. 4) when cam finger 200 is not in contact with lever 202. When lever 202 is in its normal position, the position of four-way valve 160 is such that fluid under pressure is admitted to the bottom of cylinder 84, and the sampling tube 94 is put in its raised or retracted position. When cam finger 200 contacts lever 204, rod 206 is moved to the left as shown in FIG. 1 or to the right as shown in FIG. 4 against the bias of spring 208 to reverse the position of valve 160 and thereby admit fluid under pressure to the top of cylinder 84 and cause the sampling tube 94 to be inserted into the ground. This machine can be preset to take samples at different depths by changing the size of cam 198. A larger cam will activate a longer stroke and therefore bring about a greater depth of sampling.

When sampling tube 94 is retracted, this tube is urged to the forward position (i.e. the position shown in FIG. 1 and in the solid line in FIG. 14) by means of tension spring 210, as shown in FIG. 4. Spring 210 is secured at one end to rod 212, which in turn is pivotally mounted in bracket 214 secured to sampling tube 94. The other end of tension spring 210 is mounted in bracket 216 which is attached to support member 72. When sampling tube 94 is in its forward position, the entire actuating assembly 70 is tilted as shown in the solid lines in FIG. 1.

Sampling tube 94 and actuating assembly 70 therefor can be retained in the vertical position against the bias of spring 210 by means of lever 218, which has a bumper portion 220 at right angles to the remainder of the lever which is adapted to bear against tube 94. Lever 218 is pivotally mounted on support 72 by means of pivot 222. Tension spring 224, which engages lever 218 at eyelet 226 and also engages support 72 through a bracket and eyelet 228, normally holds lever 218 out of engagement with sampling tube 94, i.e., in the solid line position as shown in FIG. 4. However, lever 218 can be moved to engage tube 94 by means of control cord 230 which is attached to the dashboard. This lever is provided so that soil samples can be taken at predetermined locations if desired, in which case it is desirable to have sampling tube 94 in the vertical position, whether it is extended into the ground or retracted. For manual operation of four-way valve 160, a control cord 234 from lever 202 to the dashboard of the tractor is provided. This control is useful when the sampling tube is used to obtain samples at a predetermined fixed location.

Figure 3:
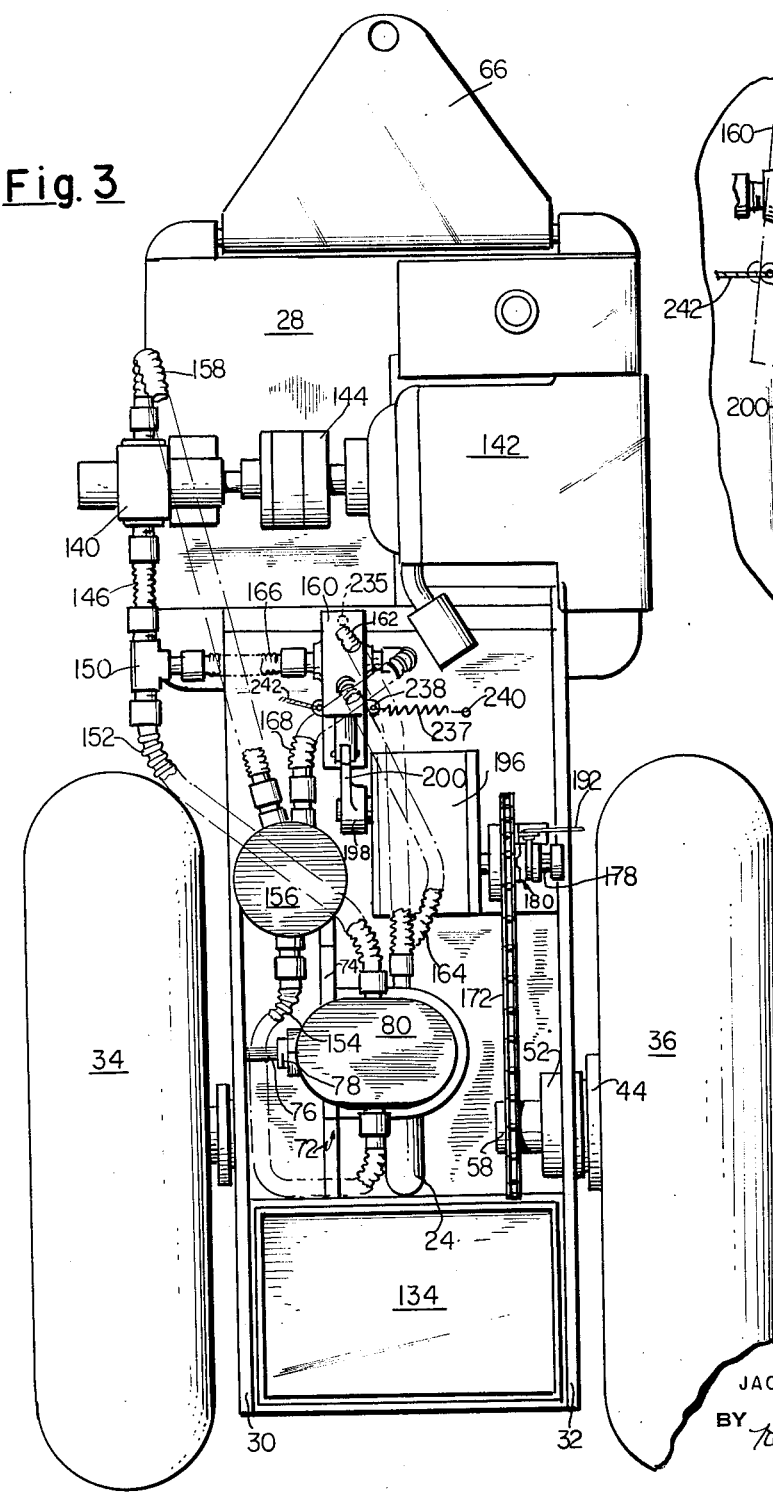
FIG. 3 is a top plan view of the soil sampler of the present invention.
Figure 5:
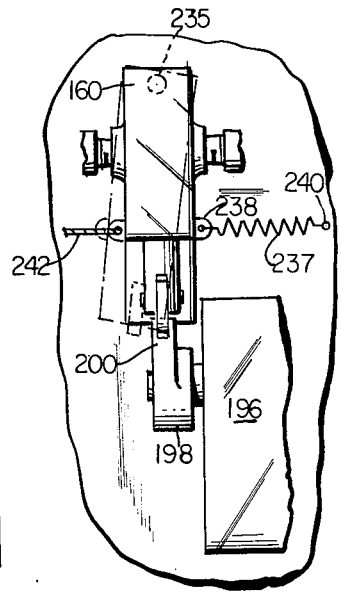
FIG. 5 is an enlarged view of a portion of FIG. 3, showing the cam and four-way valve.

Four-way valve 160 is mounted on the forward portion 28 of vehicle frame 20 by means of a single pivot 235 at the front end thereof. The normal position of four-way valve 160 is as shown in FIG. 3; i.e. the longitudinal axis of the valve is parallel to the longitudinal axis of vehicle 20. In this position cam 198 engages lever 202 during each turn of the former, and thereby periodically moves piston member 169 in valve 160 as previously described. Valve 160 can be rotated so that lever 202 is out of alignment with cam 198 by means of a control cord 242. At other times tension spring 237, which is secured to valve 160 at 238 and to vehicle frame 20 at eyelet 240, will hold valve 160 in the position shown in FIG. 3.

Operation

The normal mode of operation of the soil sampling device of this invention is to obtain soil samples at predetermined distances and depths along the ground while vehicle 20 is in motion. During normal operation, a tractor pulls vehicle 20 along the ground in the area to be sampled, and the motion of vehicle wheel 36 is transmitted through the drive mechanism as previously described to cam 198, which periodically with each turn thereof moves piston 169 in valve 160 from one position to another. The normal position of piston 169 is such that fluid under pressure is admitted to the bottom of cylinder 84 and sampling tube 94 is retracted. Each time cam finger 200 engages lever 202, the position of piston 169 is reversed, and fluid under pressure supplied to the top of cylinder 84 causing the sampling tube to be inserted into the ground. When sampling tube 94 is retracted, it is held in a forward position as shown in FIG. 14, and as it is inserted into the ground it gradually assumes the successive positions shown in FIG. 14, the tube moving from its forward position through the vertical position to a backward position which it assumes just before the moment of retraction. Thus vehicle 20 can continue in motion while sampling tube 94 is inserted into the ground. When cam finger 200 moves out of contact with lever 202, the position of piston member 169 is again reversed, returning to its normal position, causing retraction of tube 94. When sampling tube 94 is retracted, spring 210 returns the tube to its usual forward position, and tube 94 is ready for another cycle.

It will be appreciated that the device of this invention in its normal mode of operation is capable of taking soil samples at predetermined intervals along the ground, regardless of the speed at which vehicle 20 is towed or any variations in speed which may occur during towing. Since the ratio of operations of cam 198 to turns of vehicle wheel 36 is fixed, the distance which vehicle 20 travels along the ground between successive insertions of sampling tube 94 into the ground always remains the same. This assures the obtaining of individual soil samples at equal, predetermined distances, thereby assuring that a representative total soil sample will be obtained.

Sometimes it is desirable to obtain a soil sample at a preselected location. In this case vehicle 20 is brought to a stop with the sampling tube located directly over the position selected. Sampling tube 94 is held in vertical orientation by means of lever 218 in both the extended and retracted positions. Valve 160 is operated manually by means of control cord 234 and lever 202. The operator pulls cord 234, reversing the position of valve 160 and causing the sampling tube 94 to be inserted into the ground. When he lets go of cord 234, spring 208 returns lever 202 to its normal position and the sampling tube 94 is retracted.

When it is desired to tow the soil sampler of this invention over a road or through a field where no samples are to be taken, without shutting off engine 142, clutch 180 is disengaged so that the forward motion of the vehicle is not transmitted to cam 198. Cam 198 will then remain in the same position, out of engagement with lever 202, and sampling tub 94 will be held in its normal or retracted position by means of fluid pressure in the bottom of cylinder 84. This control mechanism for disengaging the cam is particularly desirable when the soil sampler is to be towed from field to field where samples are to be taken, for it is possible to keep the engine 142 running rather than shut it off while the sampler is traveling over areas where no sampling is to be done. Alternatively the same result can be accomplished by moving valve 160 and lever 202 out of alignment with cam 198. In that case, the rotation of cam 198 will not cause periodic actuation of valve piston 169 and this piston will remain in the normal position (sampling tube 94 retracted) at all times due to the urging of spring 208 on lever 202. Both reciprocation of sampling tube 94 and rotation of auger 126 can be stopped without shutting off engine 142 by reducing engine speed to a point that clutch 144 will disengage from pump 140.

When the soil sampler of this invention is at rest and it is desired to turn off engine 142, means are provided for retaining sampling tube 94 in its retracted position as shown in FIG. 1. This is accomplished by means of tension spring 210 which urges tube 94 both upwardly and to the forward position as shown in FIG. 1.

While this invention has been described with reference to a specific embodiment thereof, modifications of this embodiment within the scope of the invention will be evident to those skilled in the art. For example, the sampling device of this invention may be mounted on a powered vehicle such as a truck or tractor, rather than on a towed vehicle frame as described.

What is claimed is:

1. A mobile soil sampler comprising a vehicle frame having an upright supporting member mounted thereon, a sampling device pivotally mounted on said supporting member, said sampling device comprising a cylinder, a piston vertically reciprocable in said cylinder, a sampling tube fixedly secured to said piston and depending therefrom, a spout projecting laterally from said sampling tube, a receptacle adapted to receive soil samples discharged through said spout, a source of fluid under pressure, said sampling tube being normally held in a retracted and forward position, and means responsive to the forward motion of said vehicle for periodically admitting fluid under pressure from said source to the top of said cylinder, thereby moving said piston downwardly and injecting said sampling tube into the ground, and thereafter admitting fluid under pressure from said source to the bottom of said cylinder while said sampling tube is in the ground, thereby raising said tube and returning said tube to its normal position.

2. A mobile soil sampler comprising a vehicle frame having an upright supporting member mounted thereon, a sampling device pivotally mounted on said supporting member, said sampling device comprising a cylinder, a piston vertically reciprocable in said cylinder, a sampling tube fixedly secured to said piston and depending therefrom, a spout projecting laterally from said sampling tube, a receptacle adapted to receive samples discharged through said spout, a source of fluid under pressure, a fluid motor located above said cylinder, first conduit means providing communication between said source of fluid under pressure and said fluid motor, an auger in said sampling tube driven by said fluid motor, second and third fluid conduit means providing communication between said source of fluid under pressure and the top and the bottom of said cylinder respectively, said sampling tube being normally held in a retracted and forward position, and means responsive to the forward motion of said vehicle for periodically admitting fluid under pressure through said second conduit means to the top of said cylinder, thereby moving said piston downwardly and injecting said sampling tube into the ground and thereafter admitting fluid under pressure through said third conduit means to the bottom of said cylinder while said sampling tube is in the ground, thereby raising said tube and returning said tube to its normal position.

3. A mobile soil sampler comprising a vehicle frame having an upright supporting member mounted thereon, a sampling device comprising a cylinder, a piston vertically reciprocable in said cylinder, a sampling tube fixedly secured to said piston and depending therefrom, a spout projecting laterally from said sampling tube, a receptacle adapted to receive samples discharged through said spout, a source of fluid under pressure, a fluid motor above said cylinder, first conduit means providing communication between said source of fluid under pressure and said fluid motor, an auger in said sampling tube driven by said fluid motor, said sampling device being pivotally mounted to said supporting member at the upper end of said cylinder, second conduit means for admitting fluid under pressure to the top of said cylinder, third conduit means for admitting fluid under pressure to the bottom of said cylinder, a valve adapted to place said second conduit means in communication with said source in one position and to place said third conduit means in communication with said source in another position thereof, a drive mechanism including a cam driven by the rotation of a wheel of said vehicle, and means operated by said cam for moving said valve and thereby selectively admitting fluid under pressure sequentially to the top and to the bottom of said cylinder.

4. A mobile soil sampler comprising a vehicle frame having an upright supporting member mounted thereon, a sampling device comprising a cylinder, a piston vertically reciprocable in said cylinder, a sampling tube fixedly secured to said piston and depending therefrom, a spout projecting laterally from said sampling tube, a receptacle adapted to receive samples discharged through said spout, a source of fluid under pressure, a fluid motor above said cylinder, first conduit means providing communication between said source of fluid under pressure and said fluid motor, an auger in said sampling tube driven by said fluid motor, said sampling device being pivotally mounted at the upper end of said cylinder to said supporting member, second conduit means for admitting fluid under pressure to the top of said cylinder, third conduit means for admitting fluid under pressure to the bottom of said cylinder, a valve adapted to place said second conduit means in communication with said source in one position and to place said third conduit means in communication with said source in another position, a drive mechanism comprising a cam and means for driving said cam by the rotation of a wheel of said vehicle, the ratio of turns of said cam and said vehicle wheel being constant, and means operated by said cam for introducing fluid under pressure from said source to said second conduit means when said sampling tube is in the retracted position, thereby lowering said sampling tube into the ground and for thereafter placing said fluid pressure source in communication with the bottom of said cylinder when said sampling tube is in the ground, thereby removing said tube from the ground.

5. A mobile soil sampler comprising a vehicle frame having an upright supporting member mounted thereon, a sampling device comprising a cylinder, a piston vertically reciprocable in said cylinder, a hollow cylindrical sampling tube fixedly secured to said piston and depending therefrom, a spout projecting laterally from said sampling tube, a receptacle adapted to receive samples discharged through said spout, a source of fluid under pressure, a fluid motor located above said cylinder, first conduit means providing communication between said source of fluid under pressure and said fluid motor, an auger in said sampling tube driven by said fluid motor, said sampling device being pivotally mounted at the top of said cylinder to said supporting member, spring means for holding said sampling tube in a forward position when said sampling tube is in its raised position, second conduit means communicating with the top of said cylinder, third conduit means communicating with the bottom of said cylinder, a valve adapted to place said second conduit means in communication with said source in one position and to place said third conduit means in communication with the source in another position, a drive mechanism comprising a cam and means for driving said cam by the rotation of a wheel of said vehicle, the ratio of turns of said cam and said vehicle wheel being constant, and means operated by said cam for moving said valve from one position to another and thereby placing said fluid pressure source in communication with the top of said cylinder when said sampling tube is retracted so as to lower said sampling tube into the ground and for placing said fluid pressure source in communication with the bottom of said cylinder thereafter so as to raise said tube from the ground and return said tube to its normal retracted position.

6. A mobile soil sampler comprising a vehicle frame having a supporting member mounted thereon, a sampling device mounted on said supporting member, said sampling device comprising a cylinder, a piston vertically reciprocable in said cylinder, a sampling tube fixedly secured to said piston and depending therefrom, a spout projecting laterally from said sampling tube, a receptacle adapted to receive soil samples discharged through said spout, a source of fluid under pressure, means including a valve for selectively providing communication between said source of fluid under pressure and the top and the bottom of said cylinder, a lever located externally of said valve for operating the same, and a drive mechanism comprising a cam for engaging said lever and means for driving said cam by the rotation of a wheel of said vehicle, the ratio of turns of said cam and said vehicle wheel being constant, whereby rotation of said vehicle wheel causes said cam periodically to engage said lever and thereby causing fluid under pressure to be introduced to the top of said cylinder thereby lowering the sample tube into the ground.

References Cited by the Examiner

UNITED STATES PATENTS

| | | | |
|---|---|---|---|
| 1,362,775 | 12/1920 | Bunker | 175—310 X |
| 2,709,368 | 5/1955 | Wolpert | 173—22 X |
| 2,881,844 | 4/1959 | Miller | 172—22 |

MILTON KAUFMAN, *Primary Examiner.*

BROUGHTON G. DURHAM, *Examiner.*